(12) United States Patent
Curry et al.

(10) Patent No.: US 7,532,363 B2
(45) Date of Patent: May 12, 2009

(54) APPARATUS AND METHODS FOR DE-SCREENING SCANNED DOCUMENTS

(75) Inventors: Donald J. Curry, San Mateo, CA (US); Asghar Nafarieh, Menlo Park, CA (US); Doron Kletter, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 688 days.

(21) Appl. No.: 10/776,508

(22) Filed: Feb. 12, 2004

(65) Prior Publication Data

US 2005/0002064 A1    Jan. 6, 2005

Related U.S. Application Data (63) Continuation-in-part of application No. 10/612,064, filed on Jul. 1, 2003, now Pat. No. 7,433,084.

(51) Int. Cl.
    *G06K 15/00*    (2006.01)
    *H04N 1/405*    (2006.01)
(52) U.S. Cl. ..................... 358/3.08; 358/3.09
(58) Field of Classification Search ............... 358/3.08, 358/3.07, 3.09; 382/263
See application file for complete search history.

(56) References Cited

U.S. PATENT DOCUMENTS

| | | | |
|---|---|---|---|
| 4,812,903 A | | 3/1989 | Wagensonner et al. |
| 4,849,914 A | | 7/1989 | Medioni et al. |
| 5,333,064 A | * | 7/1994 | Seidner et al. ............. 358/3.08 |
| 5,343,309 A | * | 8/1994 | Roetling .................... 358/3.07 |
| 5,515,452 A | | 5/1996 | Penkethman et al. |
| 5,583,659 A | | 12/1996 | Lee et al. |
| 5,745,596 A | | 4/1998 | Jefferson |
| 5,822,467 A | * | 10/1998 | Lopez et al. ................ 382/261 |
| 5,900,953 A | | 5/1999 | Bottou et al. |
| 6,058,214 A | | 5/2000 | Bottou et al. |
| 6,324,305 B1 | | 11/2001 | Holladay et al. |
| 6,343,154 B1 | | 1/2002 | Bottou et al. |
| 6,400,844 B1 | | 6/2002 | Fan et al. |

(Continued)

FOREIGN PATENT DOCUMENTS

EP      0 712 094 A2    5/1996

(Continued)

OTHER PUBLICATIONS

William K. Pratt: "Digital Image Processing" 1978, John Wiley & Sons, USA, XP002327383, pp. 307-311, Figure 12.1.

(Continued)

*Primary Examiner*—Douglas Q Tran
(74) *Attorney, Agent, or Firm*—Oliff & Berridge, PLC (57) ABSTRACT

Apparatus and methods for de-screening an image signal utilizing a bank of filters to provide several increasingly blurred versions of the original image signal is disclosed. At any given time, one or more of the blurred versions are created, on a pixel-by-pixel basis. The outputs from a selected pair of blurred signals are then blended together to create a variable blending output that can vary smoothly from no blurring to maximum blurring in a smooth and continuous manner. In addition, the apparatus and methods provide enhanced text and line art by using a variable un-sharp masking mechanism with independent post-blur sharpening control, and detect and enhance neutral (no-color) output pixels.

19 Claims, 9 Drawing Sheets

U.S. PATENT DOCUMENTS

| | | | |
|---|---|---|---|
| 6,538,771 B1 * | 3/2003 | Sakatani et al. | 358/2.1 |
| 6,633,670 B1 | 10/2003 | Matthews | |
| 6,728,381 B1 * | 4/2004 | Hosoya | 381/94.1 |
| 2004/0001642 A1 | 1/2004 | Curry et al. | |

FOREIGN PATENT DOCUMENTS

EP      1 006 716 A2      6/2000

OTHER PUBLICATIONS

European Search Report.
R. De Queiroz, "Compression of Compound Documents," *IEEE*, Oct. 1999, pp. 209-213.
U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.
U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,612, filed Feb. 12, 2004, Curry et al.
U.S. Appl. No. 10/776,516, filed Feb. 12, 2004, Curry et al.

* cited by examiner

| Bnk bit 7 | Bnk bit 6 | Bnk bit 5 | |
|---|---|---|---|
| 0 | 0 | 0 | Src and Blr_1 |
| 0 | 0 | 1 | Blr_1 and Blr_2 |
| 0 | 1 | 0 | Blr_2 and Blr_3 |
| 0 | 1 | 1 | Blr_3 and Blr_4 |
| 1 | 0 | 0 | Blr_4 and Blr_5 |
| 1 | 0 | 1 | Blr_5 |
| 1 | 1 | 0 | |
| 1 | 1 | 1 | |

|   |   |   |   |   |     |
|---|---|---|---|---|-----|
| 0 | 1 | 1 | 1 | 1 | <<3 |
| 1 | 3 | 4 | 16 | 1 | >>1 |
| 2 | 5 | 9 | 81 | 809 | >>13 |
| 3 | 7 | 16 | 256 | 1 | >>5 |
| 4 | 9 | 25 | 625 | 839 | >>16 |
| 5 | 11 | 36=9*4 | 1296=81*16 | 809 | >>17 |

APPARATUS AND METHODS FOR DE-SCREENING SCANNED DOCUMENTS

This is a Continuation-in-Part of application Ser. No. 10/612,064 filed Jul. 1, 2003. The entire disclosure of the prior application is hereby incorporated by reference in its entirety.

CROSS-REFERENCE TO RELATED APPLICATIONS

This invention is related to U.S. patent applications Ser. Nos. 10/776,612, 10/776,515, 10/776,514, 10/776,608, 10/776,602, 10/776,620, 10/776,603, 10/776,509, and 10/776,516, filed on an even date herewith and incorporated by reference in their entireties.

U.S. patent application Ser. Nos. 10/187,499; 10/188,026; 10/188/249; 10/188,277; 10/188,157; 10/612,250; 10/612,057; 10/612,234; 10/612,461; 10/612,062; 10/612,261; 10/612,246; 10/612,368; 10/612,248; 10/612,063; 10/612,064 and 10/612,084, are each incorporated herein by reference in their entireties.

BACKGROUND OF THE INVENTION

1. Field of Invention

The present invention relates generally to apparatus and methods for image processing, and in particular, to apparatus and methods for de-screening scanned documents.

2. Description of Related Art

Almost all printed matter are printed using halftone screens. Halftone screens are usually optimized for a printing device, and may cause considerable halftone interference (visible large-area beating) and visible Moire patterns if not properly removed from the original scanned image. The successful removal of such halftone interference and Moire patterns without compromising text and line art quality is fundamental to quality document scanning and segmentation, and document compression.

SUMMARY OF THE INVENTION

Apparatus and methods for de-screening an image signal are disclosed. A filter bank filters an image signal and produces a set of filter output signals. In various embodiments, the apparatus and method utilizes the bank of filters to provide several increasingly blurred versions of the original signal. At any given time, one or more blurred versions are created, on a pixel-by-pixel basis. The outputs from the selected pair of blurred signals are then blended together to create a variable blending output that can vary smoothly from no blurring to maximum blurring in a smooth and continuous manner. In addition, the apparatus and methods provide enhanced text and line art by using a variable un-sharp masking mechanism with independent post-blur sharpening control, and detect and enhance neutral (no-color) output pixels.

BRIEF DESCRIPTION OF THE DRAWINGS

The features and advantages of the present invention will become apparent from the following detailed description of the present invention in which.

DETAILED DESCRIPTION OF THE DRAWINGS

Apparatus and methods provide for de-screening scanned documents such that potential halftone interference and objectionable Moire patterns may be eliminated or substantially reduced. Halftones may cause visible large-area beating and unacceptable Moire patterns if not properly removed. The de-screening operation is even more desirable for color documents because they are typically printed with four or more color separations, and each separation often uses a slightly different screen. Halftones may be selectively eliminated from the scanned input signal, while the sharp edge information of text or line objects may be preserved or enhanced. This may be accomplished even though two types of information are not spatially separated (e.g., text in lint).

In various embodiments, the apparatus and methods utilize a bank of filters to provide several increasingly blurred versions (signals) of the original signal. The one or more of the blurred signals may be created, on a pixel-by-pixel basis. The one or more created blurred signals may then be blended together to create a variable blending output signal that varies smoothly from no blurring to maximum blurring in a smooth and continuous manner.

In addition, the apparatus and methods may provide enhanced text and line art by using a variable un-sharp masking mechanism with independent post-blur sharpening control, and may detect and enhance neutral (no-color) output pixels. In various embodiments, complex logic may be utilized to determine how much to blur and/or sharpen individual pixels and to provide instantaneous enhancement control from one pixel to the next. The methods may be fully programmable through the use of piecewise linear control functions and various threshold registers. The de-screening cutoff frequencies, degree of halftone screen removal, and choice of the amount of edge enhancement may all be adjusted and tuned for high-quality output.

It should be appreciated that the apparatus and methods described below use the LAB color space. However, other color spaces such as YCbCr, RGB, etc. may be used where measures of luminance and neutrality are suitably modified. In some cases, linear YCbCr (before gamma correction) may produce better results than (non-linear) LAB.

Figure 1:
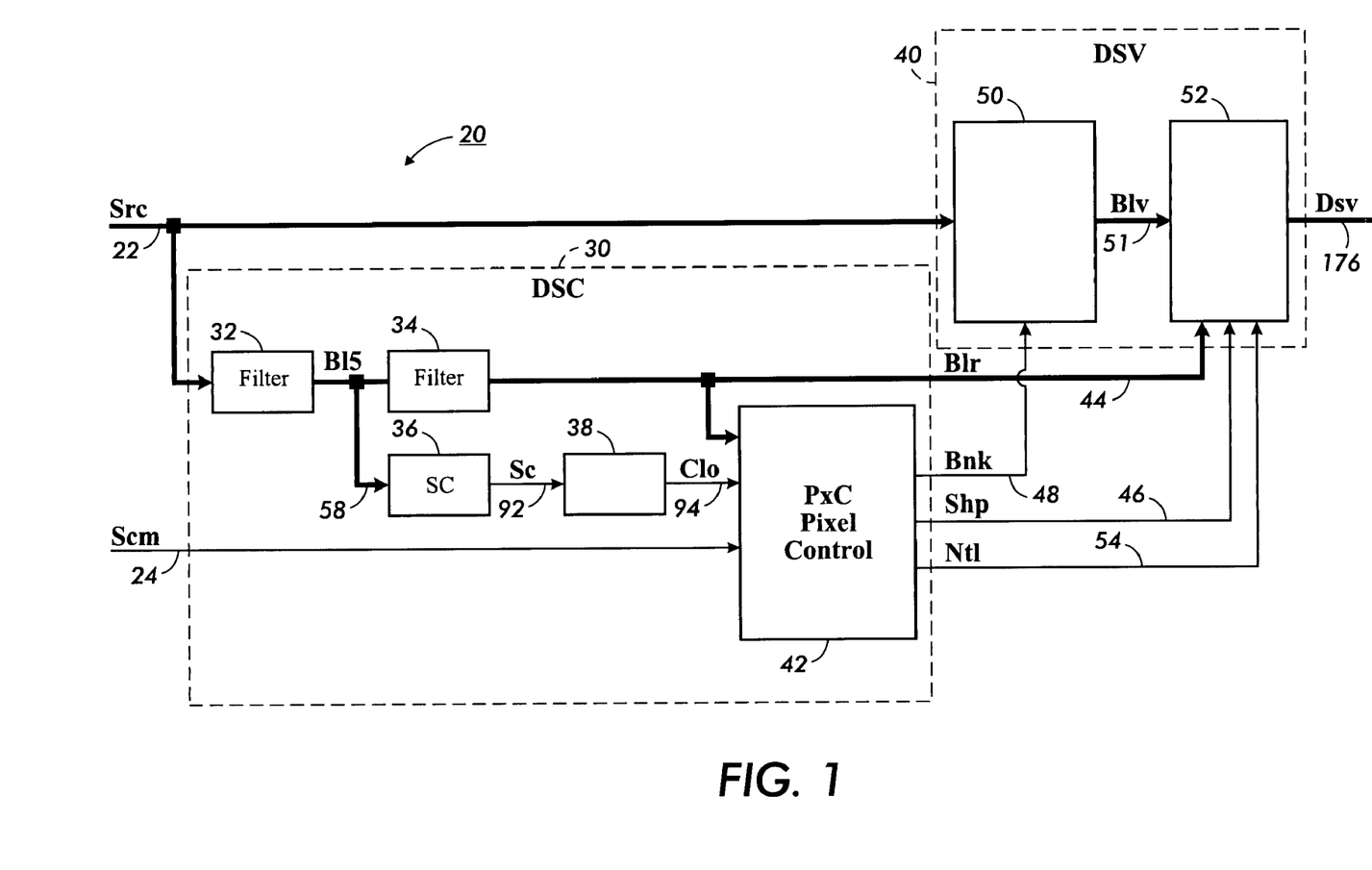
FIG. 1 shows a block diagram of a system.

FIG. 1 illustrates a de-screener 20. The de-screener 20 may be implemented in a xerographic color printer, a marking device, a digital photocopier, an ink-Jet printer and like. The de-screener 20 may be implemented in any current or future device having scanning capabilities. The de-screener 20 includes a De-Screen Control (DSC) module 30 and a De-Screen Variable (DSV) module 40. The DSC module 30 and the DSV module 40 respectively, are responsible for filtering out the original halftone patterns from a scanned image.

The de-screener 20 detects incoming halftones in the input stream and selectively filter them out. It is desirable to filter out the halftones yet maintain the sharp edges of objects in the line art on the page represented by the input image. It is desirable to simultaneously enhance text or line art objects with sharp edge definitions in order to not significantly compromise the quality of text and line art graphics. Thus, the de-screener 20 may perform two operations: filtering and enhancement.

The DSC module 30 provides the blurred color signal and the control signals to perform the filtering and enhancement. The DSC module 30 receives an input source signal Src over a signal line 22. The source signal Src may be a full-color (L, a, b) signal with chroma channels (a, b) which may have been sub-sampled by a factor of 2× in the fast scan direction. Further details of the source signal Src may be found in the incorporated U.S. patent application Ser. No. 10/612,084. The DSC module 30 may compute a super-blurred color signal Blr of the source signal Src as well as 3 control signals. The 4 signals are then passed to the DSV module 40 which modifies the source signal Src to produce an enhanced signal Dsv over a signal line 176. The enhanced signal Dsv may also be a full-color (L, a, b) signal, with similar representation and at the same rate as the source signal Src. However, the enhanced signal Dsv is an enhanced version of the source signal Src, which has been simultaneously blurred and sharpened, with much of the problematic halftone screens properly removed.

The DSC module 30 receives a screen frequency estimate signal Scm over a signal line 24 from a 1-Channel Screen Frequency Estimate (SEM) module (not shown). Further details of the SEM module may be found in the incorporated U.S. patent application Ser. No. 10/612,084. The screen frequency estimate signal Scm may be an 8-bit monochrome signal that provides the estimated screen frequency. Using the color (24-bit) source signal Src as well as the monochrome (8-bit) screen frequency: estimate signal Scm, the DSC module 30 may generate instantaneous pixel-by-pixel control signals. The pixel-by-pixel control signals may be the super-blurred color signal Blr over a signal line 44 and three monochrome control signals: bank control signal Bnk over a signal line 48; sharpness control signal Shp over a signal line 46, and pixel neutrality control signal Ntl over a signal line 54. The generation of the super-blurred color signal Blr and the three monochrome control signals bank control signal Bnk, sharpness control signal Shp, and pixel neutrality control signal Ntl are described below.

Within the DSC module 30, a first filter 32 filters the input source signal Src to create a blurred color signal Bl5 over a signal line 58. The blurred color signal Bl5 may be further filtered through a second filter 34 to produce a super-blurred color signal Blr over the signal line 44. The additional filtering may be performed to ensure that super-blurred color signal Blr is a stable and relatively noise-free signal. The super-blurred color signal Blr may be used by a pixel control module 42, and as a reference signal for the un-sharp mask filter within the DSV module 40. Both filters 32 and 34 may apply a 2-dimensional (2-D) separable and triangular filter of size (11×11). The details of this filter are given below.

Figure 2:
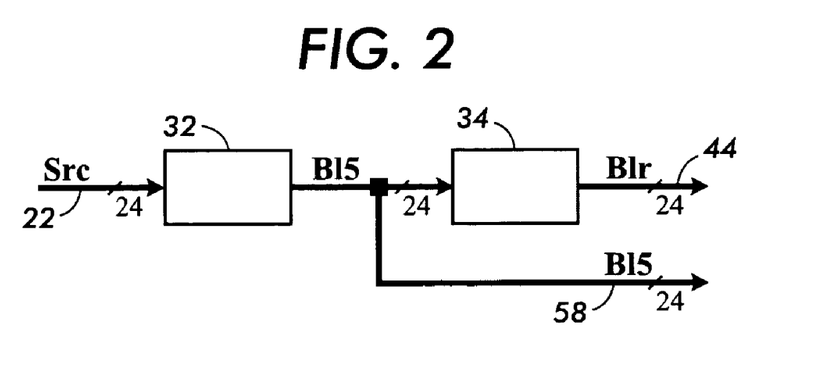
FIG. 2 illustrates filter units used to provide a set of blurred versions of an original color signal.

FIG. 2 illustrates a blurring filter arrangement in accordance with an embodiment of the invention. In one embodiment, two similar 11×11 filters 32 and 34 may be used to provide a set of blurred versions of the original color source signal Src. The size of the filters may be proportional to the inverse lowest halftone frequency that is to be detected.

The input signal to each filter is a full-color signal, where, according to the embodiment, the chroma channels are sub-sampled by a factor of two in the fast scan direction. For example, a 24-bit input source signal Src may be fed to the first filter 32 to produce a filtered blurred color signal Bl5 over the signal line 58. The filtered blurred color signal Bl5 may then be fed to the second filter 34 to produce the filtered, super-blurred color signal Blr. Both filters operate at full input data rate, each producing an independent full-color filtered output. In this embodiment, because each filter covers 11×11=121 input pixels, the filters 32 and 34 are quite compute-intensive. For this reason the filter coefficients may be restricted to simple integers in order to eliminate the need for a large number of multipliers.

Figure 3:
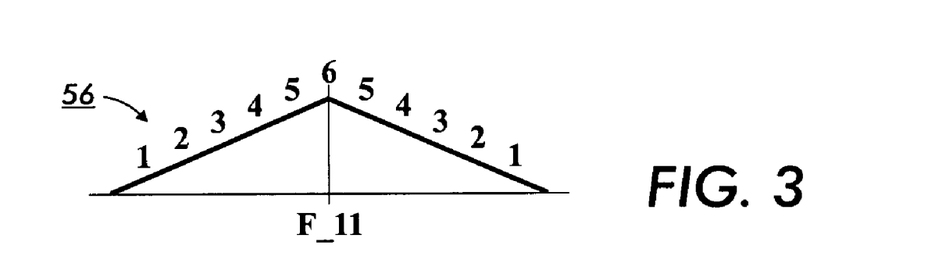
FIG. 3 illustrates a one-dimensional filter response.

In one embodiment, each filter 32 and 34 is composed of a F_11, i.e., 11×11 2-D Finite Impulse Response (FIR) filter that is symmetric and separable in shape. A one-dimensional (1-D) discrete filter response 56 is shown in FIG. 3. Each filter has a symmetric triangular shape, with integer coefficients. Since the filters are separable, it is more efficient to implement them in two 1-D orthogonal steps.

In addition, each one of the Filters 32 and 34 may apply independent 11×11 filtering on each one of the (L, a, b) color components at its input. However, since normally every two subsequent pixels may have the same chroma (a, b) values, the chroma filters may be simplified as will be more fully described below. The 1-D luminance filter shape is given by equation (1) as:

$$F_{L\_11} = \frac{1}{36}(1, 2, 3, 4, 5, 6, 5, 4, 3, 2, 1) \tag{1}$$

The overall 2-D response of the luminance F_11 filter is given by equation (2) as:

$$F\_11 = \frac{1}{1296} \begin{bmatrix} 1 \\ 2 \\ 3 \\ 4 \\ 5 \\ 6 \\ 5 \\ 4 \\ 3 \\ 2 \\ 1 \end{bmatrix} * (1, 2, 3, 4, 5, 6, 5, 4, 3, 2, 1) \tag{2}$$

Different implementations may chose to either normalize each pass back to 8 bits using:

36=455/2^14 (using a rounding right shift)

or normalize the final pass only using:

1/36*1/36=809/2^20 (using a rounding right shift).

A brute force method for filtering chroma subsampled images may be used to first expand the pixels to the same resolution as the luminance, filter using the same weights as the luminance, then average the results of adjacent chroma pairs in x to return to a X chroma subsampled representation. This method may be simplified by knowing that the source and destination chroma pixels are subsampled in X.

For instance, the chrominance filter may be implemented as two alternating filters as shown in equations (3) and (4):

$$F_{AB\_11} = \frac{1}{36}(1, x, 5, x, 9, x, 11, x, 7, x, 3) \text{ for even pixel} \quad (3)$$

and $$F_{AB\_11} = \frac{1}{36}(3, x, 7, x, 11, x, 9, x, 5, x, 1) \text{ for odd pixel} \quad (4)$$

where x=0 represents the location of unused pixels not involved in the current filtering operation. The two chroma filters may alternate every other pixel.

Normally, the output chroma may also be subsampled in the same way as the input chroma. Therefore, the chroma value for both pixels may be the average of the odd and even cases. This may also be computed in one step using a 12 pixel wide filter with weights: {1,3,5,7,9,11,11,9,7,5,3,1} and a normalizing value of 1/(36*2).

One approach to increase the filter efficiency may be to increase the vertical context and process many lines in parallel. For example, the largest filter F_11 requires 11 lines of input to produce a single line of output (an efficiency of ~9%). The filter efficiency may be improved with more input lines. For exanple, if the number of input lines is increased from 11 to 20, the filter could now generate 8 lines of output, and the efficiency goes up to 40%=8/20. However, this may require larger input buffer to hold more lines, and may result in pipeline delay.

Figure 4:
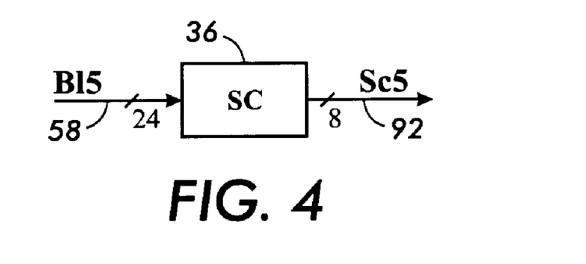
FIG. 4 illustrates a block diagram of a Sparse Contrast module.

The color output from the first Filter 32 may be forwarded to the sparse contrast (SC) module 36. The sparse contrast module 36 may measure the amount of contrast of the filtered blurred color signal B15 from the output of the first filter 32. The filtered blurred color signal B15 may be a 24-bit (L,a,b) signal with a, b sub-sampled by a factor of 2× in the fast scan direction. As shown in FIG. 4, the sparse contrast module 36 may produce a monochrome contrast value signal Sc5 over a signal line 92, which may be normalized, for example, to fit an 8-bit output range. The sparse contrast module 36 may utilize three 5×5 windows, one per color component, centered on the current pixel of interest.

Figure 5:
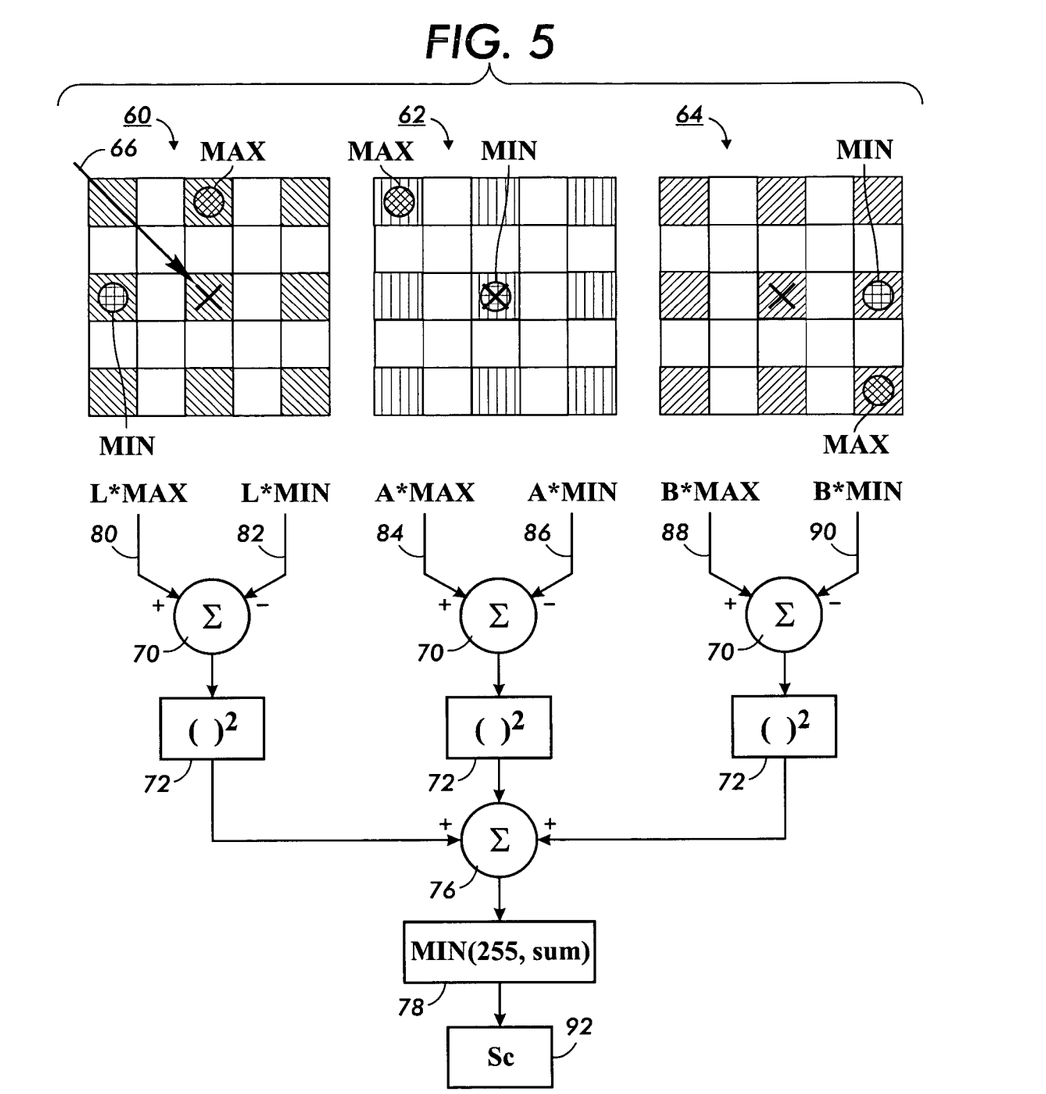
FIG. 5 shows a more detailed block diagram of the Sparse Contrast module of FIG. 4.

FIG. 5 illustrates a block diagram of the sparse contrast module 36 in accordance with an embodiment of the invention. The operation of the contrast module module 36 is as follows: For each pixel location, e.g., the content of the 5×5 windows may be searched for the minimum and maximum values. The search may be done independently for each color component.

In order to reduce the number of overall computations, the search may be performed on every other pixel location 66 (i.e., shaded pixel area) as shown in FIG. 5. The net savings from the sparse search may be 64% less computations since only 9 pixels out of 25 is compared relative to a full window search.

The combined contrast measure may be defined as the sum 70 of squared contributions 72 from each color component L(80,82), A(84, 86), and B(88,90) shown in equations (5), (6) and (7):

$$\Delta L = L_{max} - L_{min} \quad (5)$$

$$\Delta A = A_{max} - A_{min} \quad (6)$$

$$\Delta B = B_{max} - B_{min} \quad (7)$$

Where ($L_{max}$, $L_{min}$) 60, ($A_{max}$, $A_{min}$) 62, and ($B_{max}$, $B_{min}$) 64 may be the independent minimum and maximum values found within the sparse 5×5 window of the respective color component, and the output value 76 may be defined in equation (8) to be:

$$\Delta = (\Delta L^2 + \Delta A^2 + \Delta B^2) \quad (8)$$

Additional logic may be used to limit the value of the result to the range of 8-bit 78 in case the value of Δ becomes too large.

It should be appreciated that the output contrast value is a sum-of-squares measure, much like variance. It measures the largest squared contrast inside the sparse 5×5 windows. It does not matter if there is more than one pixel with the same maximum or minimum values inside the window the contrast would still be the same. Likewise, if a certain color component is constant over the window, its maximum value would be identical to its minimum, and the contrast contribution would be zero.

Figure 6:
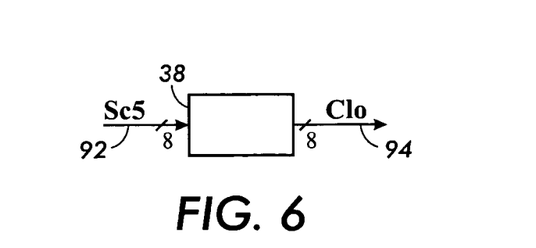
FIG. 6 illustrates a filter that outputs a filtered contrast signal.

Referring now to FIG. 6, the resulting 8-bit monochrome contrast value signal Sc5 may be forwarded to a third filter 38 to be further filtered to produce a filtered contrast signal Clo over a signal line 94. As an implementation optimization, the third filter 38 may be optionally allowed to operate at ¼ the normal rate producing a ½ scaled version of filtered contrast signal Clo. The filtered contrast signal Clo signal may then be used where it is needed by doing simple nearest-neighbor 2× up scaling.

The third filter 38 may be a type of filter similar to the first and second filters 32 and 34 described above (i.e., F_11 filter). However, a large amount of filtering may be required in order to obtain a stable contrast output signal Clo. For this reason, a large filter size may be used for the third filter 38. A principle difference between the third filter 38 and the first and second filters 32 and 34 is that in this case the third filter 38 operates on a single 8-bit gray component (as opposed to the 3-channel full-color LAB filters in the first and second filters 32 and 34).

Referring back to FIG. 1, the pixel control module 42 takes as inputs the super-blurred color signal Blr, the filtered contrast value signal Clo, and the screen frequency estimate signal Scm. The pixel control module 42 may produce an instantaneous decision, on a pixel-by-pixel basis, as to how much blurring may be applied in the Variable Triangular Blur Filter (VTF) module 50. This decision is communicated to the Variable Triangular Blur Filter module 50 for execution via the bank control signal Bnk over the signal line 48. In addition, the pixel control module 42 also generates additional enhancement controls in terms of the amount of sharpness using sharpness control signal Shp over the signal line 46 and pixel neutrality using pixel neutrality control signal Ntl over the signal line 54 for the Variable Sharpening and Neutral (VSN) module 52. The operation of the pixel control module 42 is detailed below.

Figure 7:
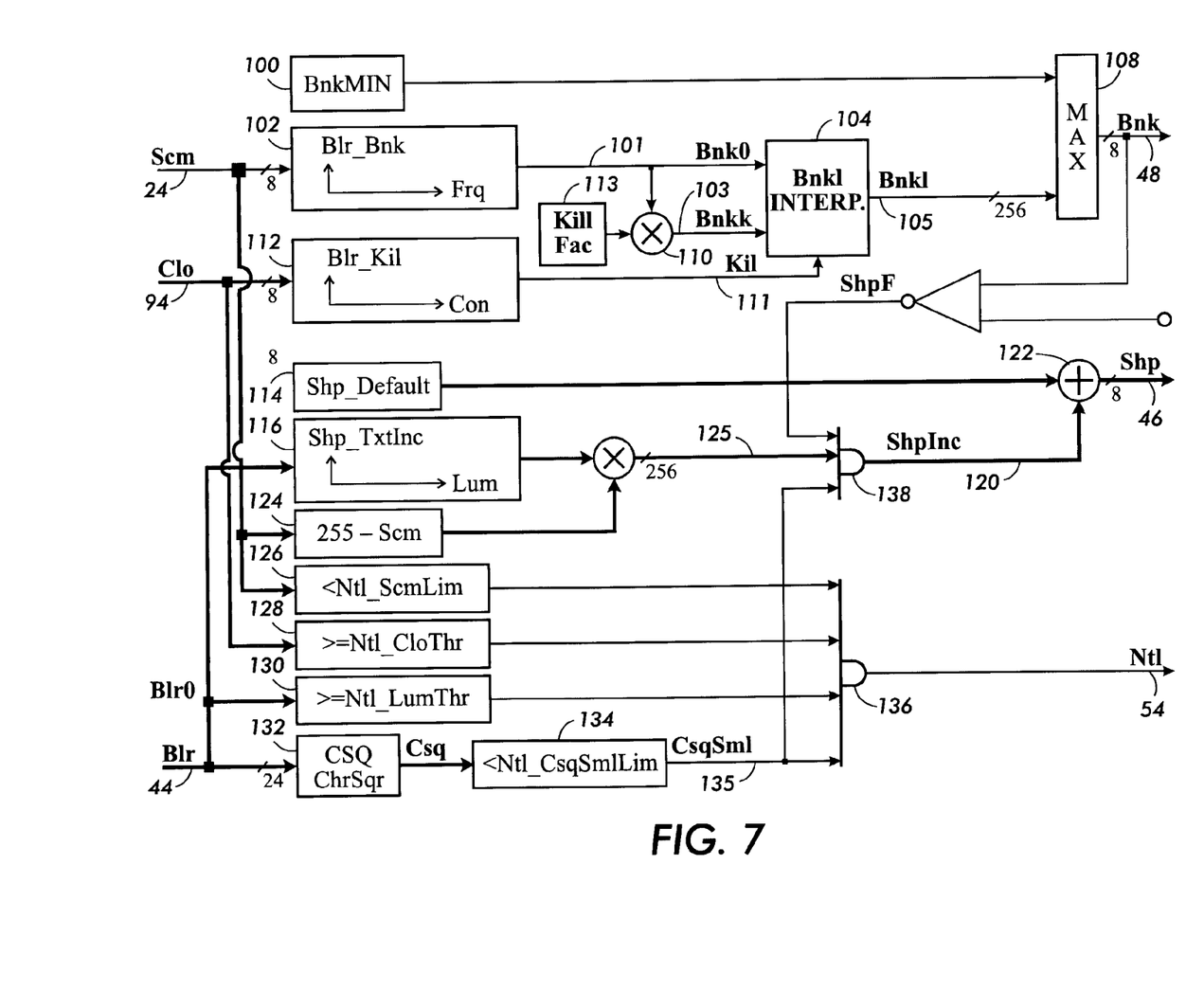
FIG. 7 shows a detailed block diagram of a Pixel Control module.

FIG. 7 illustrates a more detailed block diagram of the pixel control module 42. The pixel control module 42 may take as inputs the super-blurred color signal Blr, the filtered contrast value signal Clo, and the screen frequency estimate signal Scm. The filtered contrast value signal Clo, and the screen frequency estimate signal Scm may be all 8-bit quantities, while the super-blurred color signal Blr may be a full-color (L, a, b) signal.

The pixel control module 42 may produce, on a pixel by pixel basis, an instantaneous decision regarding which pair of filter outputs of the Variable Triangular Blur Filter module 50 (see FIG. 1) is to be blended together and by how much. This decision is communicated to the Variable Triangular Blur Filter module 50 via the bank control signal Bnk. The bank control signal Bnk (e.g., FIG. 10) may be an 8-bit signal whose top three most significant bits select the base filter, and the two next significant bits provide the amount of blending to apply between the filter output and the subsequent filter output (which is usually larger than the base filter). However, it should be appreciated that other bits assignments may be assigned depending on implementation details to select the base filter and amount of blending to be applied. The actual blending operation may be implemented inside the Variable Triangular Blur Filter module 50 using full-color linear interpolation.

In addition, the pixel control module 42 may also generate additional enhancement controls in terms of the sharpness control signal Shp and pixel neutrality control signal Ntl. These 8-bit signals may be forwarded to and executed in the Variable Sharpen and Neutral (VSN) module 52.

The pixel control module 42 may apply two programmable piecewise linear configuration functions: BnkVsScm module 102 and KilVsCon module 112 producing as outputs an intermediate bank control signal Bnk0 over a signal line 101 and a Kill control signal Kill over a signal line 111. In general, the piecewise linear function may map 8-bits of input to 8-bits of output, and may be implemented using a full 256-entry lookup table. Although the BnkVsScm module 102 is relatively complex, these functions (and others found in other modules) are typically quite simple usually involving only two significant points. These may be approximated by y=Ax+B where A is a low precision constant multiplier which may be implemented as a few add/sub operations. Alternatively, they may be implemented as lookup tables in memory.

As can be seen in the upper most part of FIG. 7, the bank control signal Bnk may be generated using the screen frequency estimate signal scm and does not require both the screen magnitude estimate signal and the screen frequency estimate signal. Since only the screen frequency estimate signal scm is required, this simplifies the generation of the bank control signal Bnk.

An intermediate bank control signal Bnk0 may be generated by passing the 8-bit input screen frequency estimate signal Scm through the top piecewise linear function BnkVsScm module 102. The intermediate bank control signal Bnk0 may be multiplied by a programmable constant factor KillFac 113 to produce an intermediate bank control signal BnkK over a signal line 103. Both intermediate bank control signal Bnk0 and intermediate bank control signal BnkK should be clamped between 0 and 160 to ensure the bank signal is within the permissible range.

A linear interpolation module 104 may then be used to blend between the intermediate bank control signal Bnk0 and the intermediate bank control signal BnkK to produce another bank control signal Bnk1 over a signal line 105. The amount of blending may be determined by the Kill control signal Kill, which may be generated from filtered contrast value signal Clo via the piecewise linear function KilVsCon module 112. Thus, the filtered contrast value signal Clo, and thus the Kill control signal Kill act as limit parameters. The KilVsCon function usually has a negative slope, resulting in increased amount of filtering when the contrast decreases. The 8-bit blended output may then be clamped with bank control minimum signal BnkMin to become the final bank control signal Bnk. A non zero bank control minimum signal BnkMin may be used for noisy scanners or when reduction scaling is required later on, maybe in the pipeline.

At the lower portion of FIG. 7, the blurred chrominance channels may be sent to the chrominance squared (CSQ) module 132, which produces the chrominance squared signal Csq. The chrominance squared signal Csq may be the clamped sum of the squared chrominance components of super-blurred color signal Blr, as follows:

$$Csq=\min(255,(Blr_A)^2+(Blr_B)^2) \quad (9)$$

The chrominance squared signal Csq may then be compared to a limit Ntl_CsqSmlLim 134 to produce a chrominance squared signal small signal CsqSml over a signal line 135, which indicates when the chrominance squared signal Csq is small. The chroma squared small signal CsqSml passed over a signal line 135 may then be used as an input to the gates 136 and 138 producing the pixel neutrality control signal Ntl and a sharpness increment value signal ShpInc, respectively. As shown in FIG. 7, the other inputs to the NTL 54 gate are:
Scm<Ntl_ScmLim (true when Scm small) 126
Clo>=Ntl_CloThr (true when Clo not small) 128
Blr0>=Ntl_LumThr (true when blurred luminance not small) 130

The pixel neutrality signal Ntl output may be passed over the signal line 54 to the Neutral Adjust Module 188 (see FIG. 15) and used in a subsequent stage to neutralize pixels by changing the A and B pixel values (as described below).

Figure 8:
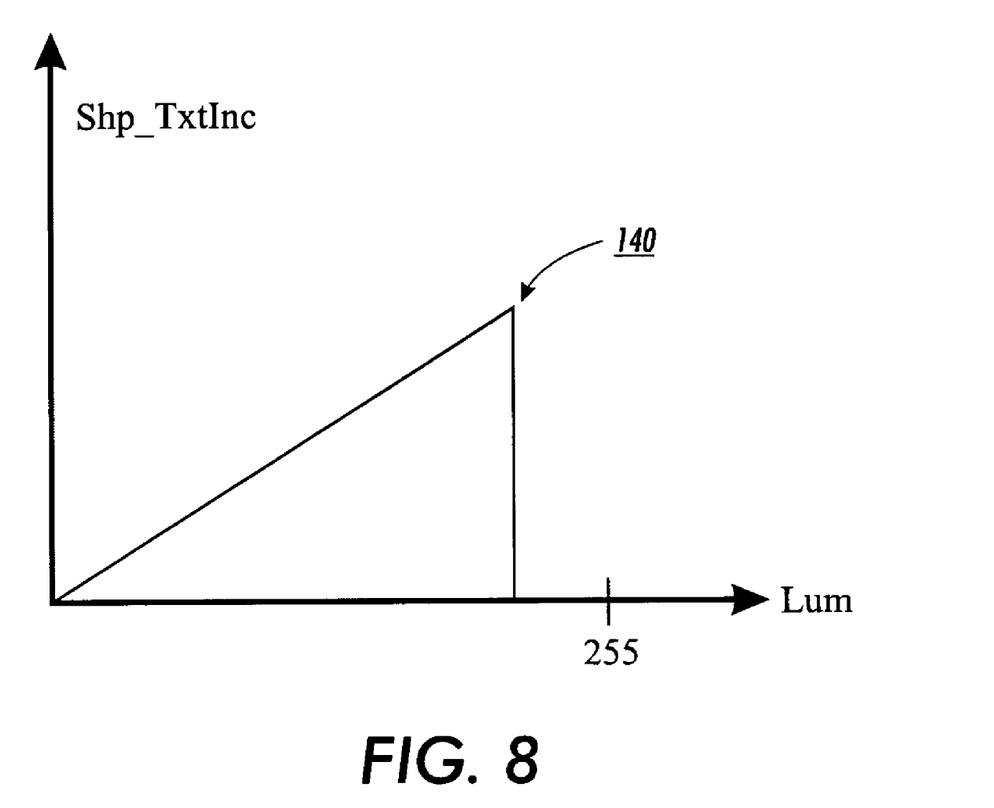
FIG. 8 shows a Shp_TxtIncVsLum piece-wise-linear function constrained to be a saw-tooth shaped function.

The sharpness control logic is in the center part of FIG. 7. The luminance component of the blurred signal Blr0 may be passed through Shp_TxtIncVsLum piece-wise-linear function. The function of the Shp_TxtIncVsLum is to increase text sharpness based on the luminance value of the blurred signal Blr0. For example, if the luminance value of the blurred signal Blr0 is small, little sharpening is applied to the blended signal Blv (see FIG. 15). Low luminance may imply thick and dark text. If the luminance value is high, more sharpening is applied to the blended signal Blv. High luminance may imply a lighter text. However, if the text becomes too light, the sharpening may be abruptly stopped to prevent enhancement of the background noise. In various embodiments, the Shp_TxtIncVsLum may be constrained to a saw-tooth shaped function 140 as illustrated in FIG. 8. However, various shapes may be used for the Shp_TxtIncVsLum to achieve a desired result.

The output from the Shp_TxtIncVsLum piece-wise-linear function, labeled Shp2, may be passed to the three-way AND gate 138. The two other inputs to the AND gate 138 may include the chroma squared small signal CsqSml (described above) and ShpF signal. The chroma squared small signal CsqSml ensures that the additional sharpening is only applied to nearly neutral text edges. The ShpF signal may turn off the additional sharpening if the bank signal Bnk is non-zero. The latter condition may indicate the existence of halftones or screens in the neighborhood, for which it is desirable to reduce sharpening to prevent undesirable artifacts.

The sharpness increment value ShpInc output from the 3-way AND gate 138 may be added to the default sharp Shp_Default producing the sharpness control signal Shp. The Shp_Default value may be used to preset a default amount of sharpening as an enhancement for text and line-art.

Figure 9:
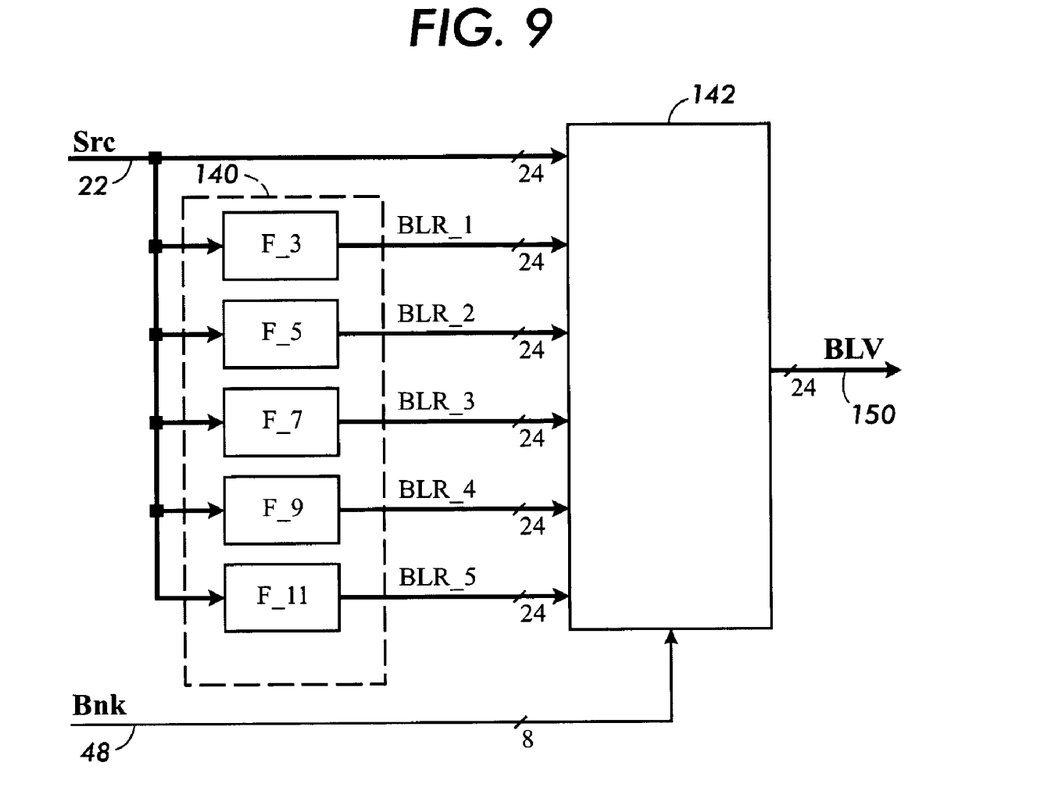
FIG. 9 shows a detailed block diagram of a Variable Triangular Blur Filter module (VTF)
Figure 10:
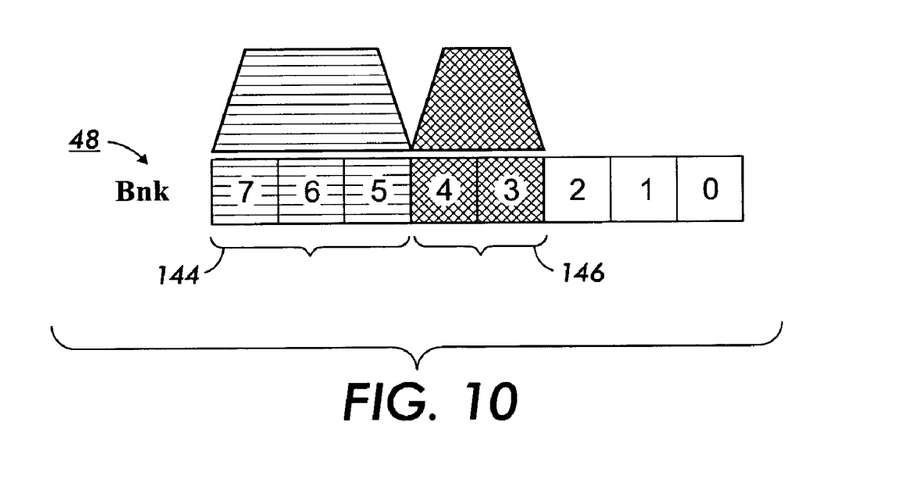
FIG. 10 illustrates a configuration of a bank control signal.

FIG. 9 illustrates a block diagram of the Variable Triangular Blur Filter module 50 in accordance with one embodiment of the invention. Much of the De-Screen work may be performed in the Variable Triangular Blur Filter module 50. In this embodiment, the Variable Triangular Blur Filter module 50 includes a Filter Bank 140 that may, at any given time, produce two out of five subsequently filtered versions of the input signal, each with an increasingly larger filter span. Referring to FIG. 10, the top three bits of a bank control signal Bnk select which pair of filters is to be used. The outputs of the selected filters are then blended together by the amount of blending specified in the next lower two bits of the bank control signal Bnk. The selection of which filters to blend and by what amount can change on a pixel-by-pixel basis, depending on the content of the 8-bit bank control signal Bnk.

The full-color blended blended Blv from the Variable Triangular Blur Filter module 50 is forwarded to the Variable Sharpening and Neutral module 52. The Variable Sharpening and Neutral module 52 may provide capabilities to further enhance the blended signal Blv. These capabilities may include sharpening the blended signal Blv and controlling its neutrality on the chroma axes. The Variable Triangular Blur Filter module 50 includes a built-in un-sharp mask filter that uses the super-blurred color signal Blr as a reference signal. The amount of sharpening is controlled by the sharpness control signal Shp. In addition, a built-in chroma adjustment circuitry can force the output enhanced signal Dsv to be neutral (a=b=128) (equal to zero) to be non-neutral or (b=+127) (equal to −1) depending on the content of the pixel neutrality control signal Ntl.

The Variable Triangular Blur Filter module 50 is responsible for applying the main De-Screen operation by blurring the color input source signal Src to remove the original halftone screen patterns. The amount of blurring may be modified on a pixel-by-pixel basis. The Variable Triangular Blur Filter module 50 may be made up of several fixed triangular blurring filters. Outputs from subsequent filters may be blended together to generate a variable blurred signal that may smoothly vary from the original source signal Src to the output of the largest, most heavily blurred F_11, i.e., first and second filters 32 and 34.

Inputs to the Variable Triangular Blur Filter module 50 may include the full-color Lab source signal Src and the monochrome 8-bit bank control signal Bnk. The output from the Variable Triangular Blur Filter module 50 may be the full-color de-screened blended signal Blv, which is a blurred and blended version of the input source signal Src. The de-screened blended signal Blv may be delivered to the Variable Sharpen and Neutral module 52 for further processing and enhancement.

The Variable Triangular Blur Filter module 50 includes a Filter Bank module 140 and a Variable Blend module 142. The Filter Bank module 140 may be the most computationally intensive in the de-screener 20. As shown in FIG. 9, the Filter Bank module 140 provides five increasingly blurred versions of the original signal BLR_1, BLR_2, BLR_3, BLR_4 and BLR_5.

Figure 12:
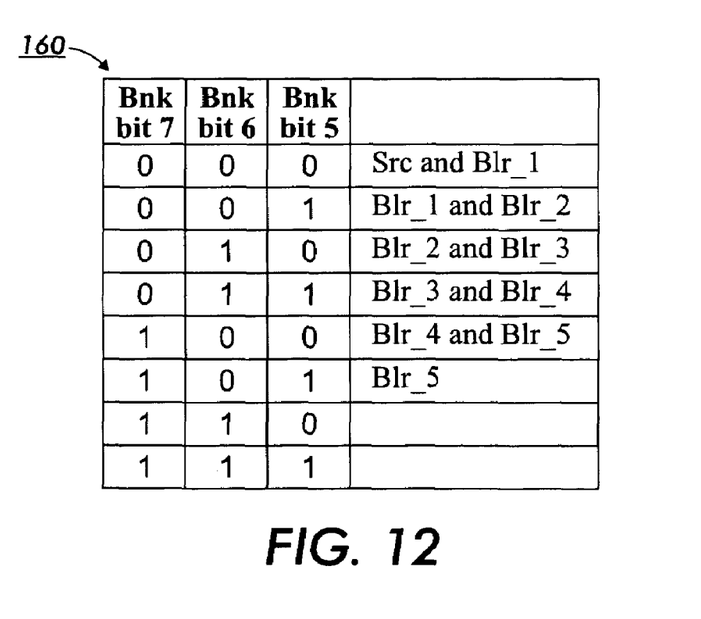
FIG. 12 is a table showing subsequent filter pairs based on the top three Bank bits.

Selected blurred signals are blended together to create a variable blended output that can smoothly transition from no blurring (output=input source signal Src) to maximum blurring in a continuous manner. Specifically, the pixel control module 42 determines the selection of filters to use and the amount of blending via the bank control Bnk 48 signal. For example, as shown in FIG. 10, the top three bits select the bank pair, and the next two define the amount of blending to apply. The use of these bits is captured in the Tables shown in FIGS. 12 and 13.

Figure 11:
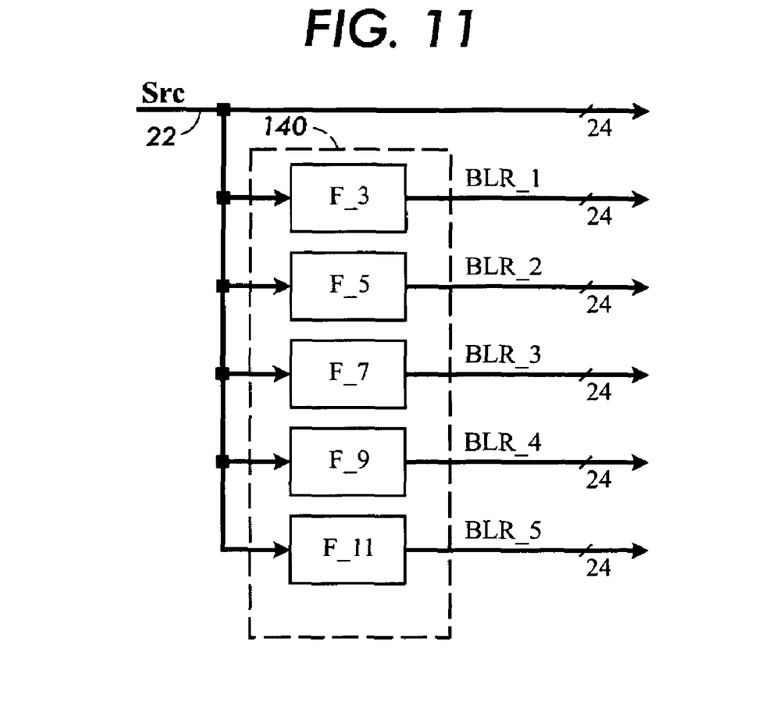
FIG. 11 shows a block diagram of a Filter Bank module.

The Filter Bank 140 includes five independent full-color triangular filters: F_3, F_5, F_7, F_9, and F_11. The Filter Bank 140 arrangement is shown in FIG. 11. The size of the largest filter in the Filter Bank 140 is determined by the lowest halftone frequency that is to be detected.

The input signal to each one of the filters is the full-color Lab source signal Src, where the chroma channels (a, b) are normally sub-sampled by a factor of two in the fast scan direction. Whatever the pair of filters that is selected, those filters are operating at the full input source signal Src data rate, each producing its own independent full-color blurred output, labeled BLR_n, with n being the filter index.

Figure 14:
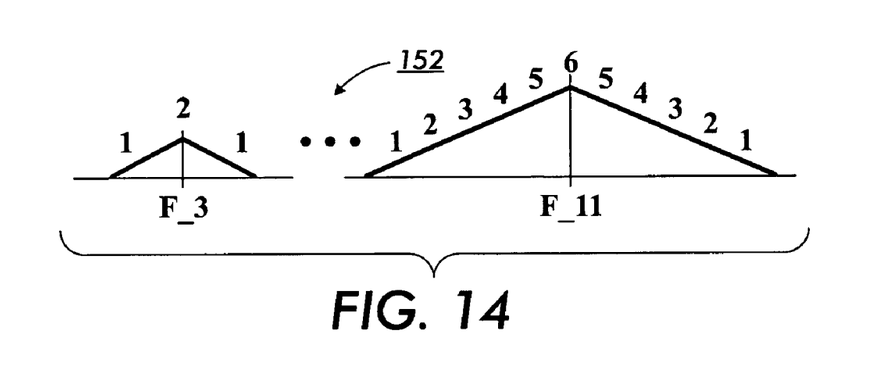
FIG. 14 illustrates one dimensional filter responses of the various Filter Bank filters.

Each filter (out of the two that are currently selected) processes the input data independently for each of the (Lab) color components. Each filter has a symmetric, triangular and separable shape, with integer coefficients. The 1-D discrete response of the filters 152 is shown in FIG. 14. Bits 4, and 5 of the bank control signal Bnk specify the blending factor Blend 146, which is usually a fractional bank value. The de-screened blended signal Blv is given as:

$$Blv=(Blr\_n*(4-Blend)+Blend*(Blr\_n+1)+2)/4 \quad (10)$$

The added 2 provides nearest integer rounding. Each filter output is first only normalized back to an 11-bit range (without rounding). That is, each result is left scaled up by a factor of 8. This preserves 3 extra bits of precision for the blending operation. Equation (11) describes the final blending step in which rounding and the extra factors of 8 are taken into account as follows:

$$Blv=(8\times Blr\_n*(4-Blend)+ \\ Blend*(8\times Blr\_n+1)+16)/32 \quad (11)$$

Figure 13:
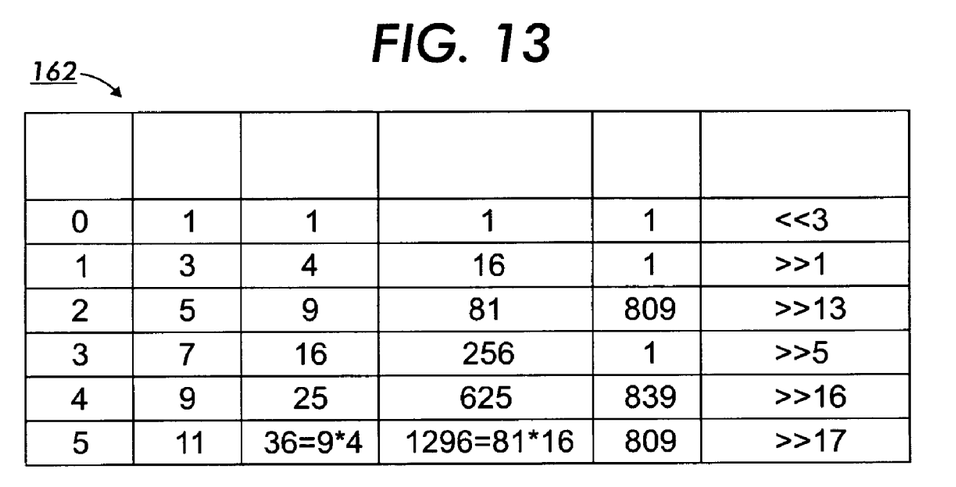
FIG. 13 is a table displaying normalization factors and shifts.

The normalization factors and shifts, which leave the intermediate results scaled up by 8, are shown in the Table shown in FIG. 13. Filter index 0 (the unfiltered Src) must be left shifted 3 (multiplied by 8). All other shifts are right shifts.

In general, when rounding is called for, it is applied by adding in half the divisor prior to performing a shift. Since right shift, performed on 2's complement coded binary numbers is the equivalent of floor (numerator/2^shift), adding half the divisor causes nearest integer rounding for both signed and unsigned numerators. Also it is best to only round once during a final scaling step.

The overall 2-D response of the smallest filter, F_3, is given in equation (12) as:

$$F\_3 = \frac{1}{16}\begin{bmatrix}1\\2\\1\end{bmatrix}*(1,2,1) = \frac{1}{16}\begin{bmatrix}1 & 2 & 1\\2 & 4 & 2\\1 & 2 & 1\end{bmatrix} \quad (12)$$

The larger filters are similarly described. The F_11 equation is identical to that in (12). Since these filters are separable, it is best to implement them in two orthogonal 1D steps. For a more efficient implementation of the first step, the larger filters can share partial results with the smaller filter rather than calculate them separately. For example, each of the 1D un-normalized triangular sums $Tri_N$ can be computed using the following loop:

N=0
   Sum0=pixel(0)
   Tri0=Sum0
   For (N in 0 to 4)
      SumN+1=SumN+pixel(−N−1)+pixel(N+1)
      TriN+1=TriN+SumN+1

Where pixel index zero is the current pixel of interest, and positive index axis is in normal raster order scan. One approach to increase the filter efficiency is to increase the vertical context and process many lines in parallel. For example, the largest filter F_11 requires 11 lines of input to produce a single line of output (an efficiency of ~9%). The filter efficiency is improved with more input lines. For example, if the number of input lines is increased from 11 to 20, the filter could now generate 8 lines of output, and the efficiency goes up to 40%=8/20. This requires larger input buffer to hold more lines and implies a larger pipeline delay.

Referring back to FIG. 1, the Variable Sharpening and Neutral module 52 is responsible for applying additional sharpening enhancement and adjusting the output chroma. The inputs to the Variable Sharpening and Neutral module 52 include the full-color blended signal Blv, the super-blurred color signal Blr, and the two 8-bit control signals Shp and Ntl for the sharpness control and pixel neutrality control, respectively. The output of the Variable Sharpening and Neutral module 52 is the full-color enhanced signal Dsv.

Figure 15:
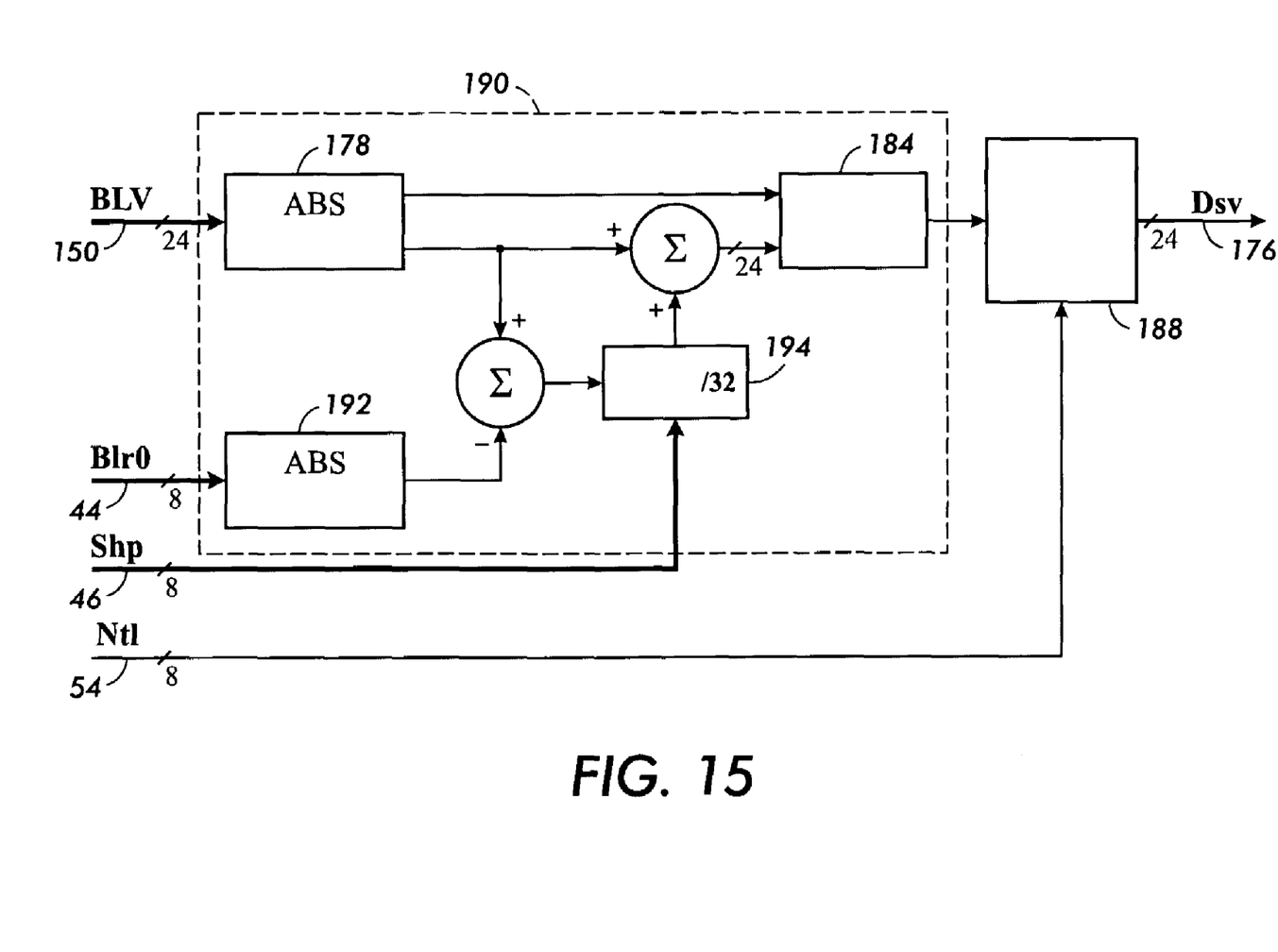
FIG. 15 shows a block diagram of a Variable Sharpen and Neutral module (VSN).

FIG. 15 illustrates a block diagram of the Variable Sharpening and Neutral module 52 according to one embodiment of the invention. The Variable Sharpening and Neutral module 52 includes the elements of an un-sharp mask sharpening filter 190 and a Neutral Adjust module 188. The un-sharp mask filter 190 may be applied to the luminance component. The blended signal Blv from the Variable Triangular Blur Filter 50 may be mixed with the super-blurred color signal Blr from the DSC module 30 (see FIG. 1). The (a, b) chroma components of the blended signal Blv are passed unmodified through the un-sharp mask filter 190.

The operation of the Un-sharp Mask Filter 190 may be achieved by substracting a low-frequency version of the source input-the super-blurred color signal Blr-from the blended signal Blv. The difference is then scaled by some factor that is determined by the sharpness control signal Shp supplied by the pixel control module 42, and then added back to the blended output. Since the Un-sharp Mask filter 190 subtracts some portion of the low frequency content, the difference contains more of the high-frequency content. By adding more of the high-frequency content back to the original blended signal blv, the net result is to enhance image and sharpen it. The sharpness control signal Shp may be interpreted as a fixed-point 1.5 number, such that the value of 32 is defined to be the sharpening factor of 1.0. Thus, the amount of sharpening can vary from zero and up to the addition of 8 times the high frequency content. The clamp 184 simply limits the sharpened luminance output to be between 0 and 255.

The Neutral Adjustment module 188 controls the chroma components (A, B) values of the final enhanced signal Dsv. If the Ntl_Enable configuration parameter is true, then the pixel neutral control signal Ntl supplied by pixel control module 42 will force the chroma components to zero by setting the output chroma values to A=B=128. Also, if Ntl_EnsureNonNtl is enabled, then if the Ntl control is false but the pixel chroma components after sharpening are both 128, one of its chroma components (B) is forced away from zero by arbitrary setting it to 127 (equal to −1).

It should be appreciated that, in various exemplary embodiments, the de-screener 20 may be implemented as software executing on a programmed general purpose computer. Likewise, the de-screener 20 may also be implemented on a special purpose computer, a programmed microprocessor or microcontroller and peripheral integrated circuit elements, and ASIC or other integrated circuit, a digital signal processor (DSP), a hardwired electronic or logic circuit, such as a discrete element circuit, a programmable logic device, such as a PLD, PLA, FPGA or PAL, or the like. In general, any device that is capable of implementing the functionality disclosed herein and in the incorporated 499; 026; 249; 277; 157; 250; 057; 234; 461; 062; 261; 246; 368; 248; 063; 064 and 084 applications can be used to implement the de-screener 20. Each of the various signal lines outlined above in FIGS. 1, 2, 4, 5, 6, 7, 9, 11, and 15 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above with respect to the above figures.

It should be understood that each of the circuits, routines, applications, modules or the like outlined above with respect to FIG. 1 can be implemented as software that is stored on a computer-readable medium and that is executable on a programmed general purpose computer, a programmed special purpose computer, a programmed microprocessor, a programmed digital signal processor or the like. Such a computer-readable medium includes using a carrier wave or the like to provide the software instructions to a processing device. It should also be understood that each of the circuits, routines, applications, objects, procedures, managers and/or modules outlined above with respect to FIG. 1 can be implemented as portions of a suitably programmed general purpose computer. Alternatively, each of the circuits, routines, applications, objects, procedures, managers and/or modules shown in FIG. 1 can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules shown in FIG. 1 will take is a design choice and it will be obvious and predictable to those skilled in the art. It should be appreciated that the circuits, routines, applications, objects, procedures, managers and/or modules shown in FIG. 1 do not need to be of the same design.

It should be appreciated that a routine, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device. These steps can be performed by a computer executing the instructions that define the steps. Thus, the terms "routine", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing described with respect to FIG. 1 can be performed by a computer executing one or more appropriate programs, by special purpose hardware designed to perform the method, or any combination of such hardware, firmware and software elements.

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for de-screening image data, comprising:
generating an estimated screen frequency of the image data;
selecting two or more filters from a filter bank based directly on the estimated screen frequency and one or more limit parameters;
filtering the image data using the selected two or more filters from the filter bank such that the image data is filtered by each of the selected two or more filters resulting in two or more filtered image data each corresponding to either the entire image data or a same portion of the image data; and
blending the two or more filtered image data to form blended image data.

2. The method of claim 1, further comprising
generating a blend select signal that indicates how the two or more filtered image data are to be blended.

3. The method of claim 2, further comprising:
sharpening selected portions of blended image data based on luminance of the blended image data.

4. The method of claim 3, the sharpening comprising:
increasing sharpness of a selected portion if a luminance of the selected portion is below a predetermined threshold, a magnitude of sharpness being increased with increasing magnitude of the luminance.

5. The method of claim 1, further comprising:
generating intermediate filter selecting signals based on the estimated screen frequency;
generating a filter selecting signal based on the intermediate filter selecting signals and the one or more limit parameters;
selecting the two or more filters from the filter bank based on the filter selecting signal.

6. The method of claim 2, further comprising:
selecting a luminance component of a portion of the blended image data; and
adjusting the luminance component of the portion of the blended image data based on a sharpness control signal.

7. The method of claim 2, further comprising:
selecting chroma components of a portion of the blended image data; and
adjusting the chroma components of the portion of the blended image data based on a neutral control signal.

8. The method of claim 2, wherein the operations of generating, selecting filtering and blending are performed dynamically.

9. An apparatus to de-screen image data, comprising:
a screen frequency estimater to generate an estimated screen frequency of the image data;
a filter selector to select two or more filters from a filter bank based directly on the estimated screen frequency and one or more limit parameters;
a filterer to filter the image data using the selected two or more filters from the filter bank such that the image data is filtered by each of the two or more filters to result in two or more filtered image data each corresponding to either the entire image data or a same portion of the image data; and
a filter output blender to blend the two or more filtered image data into blended image data.

10. The apparatus of claim 9, further comprising:
a blend selector to generate a blend select signal that indicates how the outputs of the selected two or more filters are to be blended.

11. The apparatus of claim 10, further comprising:
an image data sharpener to sharpen selected portions of blended image data based on luminance of the selected portions.

12. The apparatus of claim 11, wherein the image data sharpener increases sharpness of a selected portion if a luminance of the selected portion is below a predetermined threshold, a magnitude of sharpness being increased with increasing magnitude of the luminance.

13. The apparatus of claim 9, wherein the filter selector generates intermediate filter selecting signals based on the estimated screen frequency, and generates the filter selecting signal based on the intermediate filter selecting signals and one or more limit parameters.

14. The apparatus of claim 10, further comprising:
an image data neutralizer to neutralize selected portions of blended image data based on chroma components of the selected portions.

15. A xerographic marking device incorporating the apparatus of claim 9.

16. A scanning device incorporating the apparatus of claim 9.

17. A digital photocopier incorporating the apparatus of claim 9.

18. An apparatus to de-screen image data comprising:
means for generating an estimated screen frequency of the image data;
means for selecting two or more filters from a filter bank based directly on the estimated screen frequency and one or more limit parameters;
means for filtering the image data using the selected two or more filters from the filter bank such that the image data is filtered by each of the two or more filters resulting in two or more filtered image data each corresponding to either the entire image data or a same portion of the image data; and
means for blending the two or more filtered image data into blended image data.

19. The apparatus of claim 18, further comprising:
means for increasing sharpness of a selected portions of blended image data if a luminance of a selected portion is below a predetermined threshold, a magnitude of sharpness being increased with increasing magnitude of the luminance.

* * * * *